Sept. 9, 1952  D. MACKEY ET AL  2,610,012
FASTENING DEVICE
Filed June 30, 1949
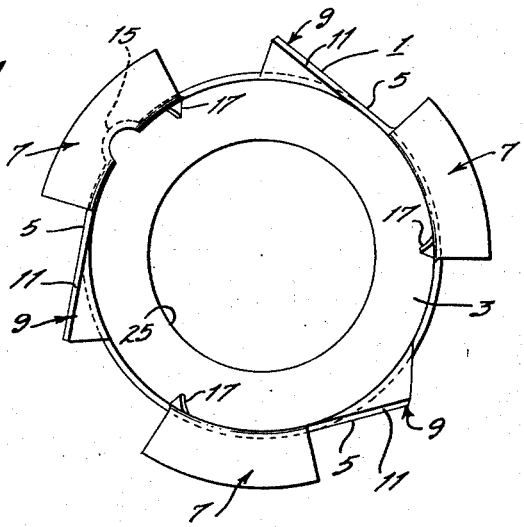
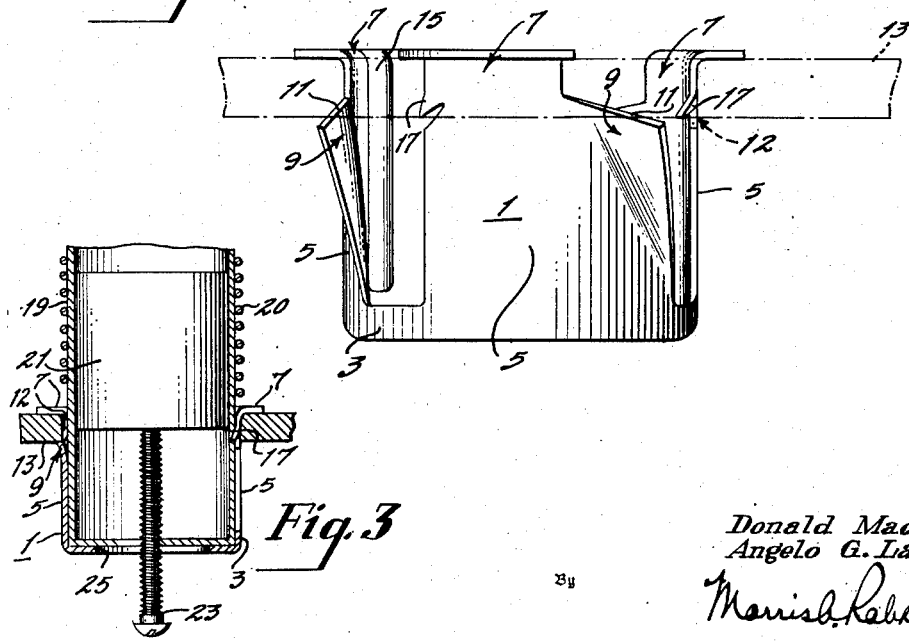
Inventors
Donald Mackey &
Angelo G. Lazzery
Attorney Patented Sept. 9, 1952

2,610,012

UNITED STATES PATENT OFFICE 2,610,012

FASTENING DEVICE

Donald Mackey, Haddon Heights, and Angelo G. Lazzery, Oaklyn, N. J., assignors to Radio Corporation of America, a corporation of Delaware Application June 30, 1949, Serial No. 102,204

5 Claims. (Cl. 248—27)

This invention relates to an improved fastening device, and more particularly to an improved sheet metal fastener for mounting an article in a generally normal position with respect to a supporting panel.

The fastening device of our present invention is particularly useful in mounting objects such as coil forms on relatively thin, sheet metal panels which form the chassis of a radio receiver. In order to secure the coil form firmly in position on the panel, a suitable mounting or fastening device is required. In many cases, the fastening device must be secured to the panel by additional means which not only occupies extra space, but also consumes extra time in the process of assembly and adds to the cost of manufacture. The type of fastener which is particularly suitable as a support for instruments on thin panels is exemplified by the disclosures in the patents to G. A. Tinnerman, 2,244,976, and 2,326,903, dated, respectively, June 10, 1941, and August 17, 1943, wherein the fastener is inserted within an aperture provided in the panel and securely fastened or locked therein by engaging the walls of the aperture.

Irrespective of the advantages claimed for prior art fastening devices of this type, difficulties have been encountered frequently with these fasteners in the process of assembly of the radio instruments. Many of the fastening devices will not adjust themselves to panels having relatively small variations in thickness and still effect a rigid support. In many installations, the assembly of parts is carried out more efficiently and expeditiously by mounting the fastener on the instrument to be supported prior to its assembly on the panel support. This process of assembly is impossible with many of the prior art fasteners. In some cases, this involves an additional manual step in the assembly, which otherwise could be more economically and efficiently performed mechanically.

The principal object of our present invention is to overcome the above, as well as other, disadvantages of prior art fastening devices useful in mounting cylindrical objects on relatively thin panel supports.

It is also an object of our present invention to provide a fastening device which will have locking engagement with the wall of an aperture in a panel support and which will receive an article for mounting in a normal position with respect to the panel support.

It is another object of our present invention to provide a fastening device which will readily accommodate itself to apertured supports of different thicknesses while at the same time occupying a minimum overall area on the panel support and furthermore holding the article to be supported in a rigid position on its support and preventing its withdrawal therefrom.

Still another object of our present invention is to provide a fastening device which is suitable for automatic assembly of the article to be supported prior to mounting of the members on the supporting panel.

Another object of our present invention is to provide an improved fastening device which is simple and easy to construct, one which can be produced at a minimum of cost, and one which can be quickly and easily assembled either manually or automatically.

In accordance with our present invention, the fastening device comprises a body of generally cylindrical or other suitable shape adapted to be inserted within an aperture of corresponding shape in a panel support. The body comprises a cup-like base portion and circumferentially spaced extensions on the open end of the base portion. The circumferentially spaced extensions are provided with spaced, outwardly extending members for engaging opposite surfaces of the panel support, thereby to lock the fastener within the support aperture. A longitudinal, outwardly extending rib is provided on the fastener, extending substantially from the base portion to the free end of one of the extensions, for engagement with a detent in the wall of the support aperture, the purpose of this rib being to orient the instrument to be supported and to prevent rotation of the fastener in the support aperture. Inwardly extending barbs are provided on an edge of the extensions, the barbs being adapted to pierce the cylindrical coil form to thereby prevent rotation of the coil form in the fastener as well as to prevent removal therefrom.

The novel features of our invention, as well as additional objects and advantages thereof, will be better understood from the following detailed description when read in connection with the accompanying drawing, in which:

Figure 1 is a plan view of one form of fastener in accordance with our present invention, Figure 2 is a side elevation view of the fastener shown in Figure 1, and Figure 3 is a side view, in section, taken through the center of a fastening device in accordance with our present invention, and showing a variable inductance coil mounted therein.

Referring more particularly to the drawing, wherein similar reference characters designate corresponding parts throughout, there is shown a fastening device comprising a hollow body 1 which has been illustrated as of generally cylindrical shape but which may be of any other suitable shape in cross section. The body 1 is preferably constructed of relatively thin sheet metal and has a cup-like base portion 3 and a plurality of circumferentially distributed, spaced, finger-like members 5 extending from the open end of the base portion.

Each of the finger-like members 5 terminates in part in a flanged end portion 7, the flange being integral with and extending outwardly from substantially one half the width of its finger-like member at the free end thereof. The remaining portion of the free end is curved outwardly to provide a resilient tongue-like or shoulder portion 9 the upper edge 11 of which is gradually inclined away from the flanged end portion 7.

The fastening device 1 is dimensioned for insertion in an aperture 12 of corresponding shape in a panel support 13 so that the flanged end portions 7 and the inclined edges 11 will engage opposite surfaces of the panel support 13 for securely holding the fastener within the panel aperture and preventing easy removal therefrom. Inasmuch as the tongue-like portions 9 are resilient, when the fastener is inserted into the panel opening 12, the tongue-like portions 9 will be compressed to the extent necessary to insert the fastener 1 in the opening until the flanged end portions 7 engage the outer surface of the panel support 13 whereupon the tongue-like portions 9 will automatically spring outwardly to engage the opposite side of the panel support 13 and lock the fastener 1 within the panel aperture 12. The fastener 1 is readily adjustable to various thicknesses of panel supports by reason of the outwardly extending, inclined edge 11, thus insuring a maximum frictional contact and tight fit between the fastener 1 and the panel support 13 and preventing rocking movement of the fastener within the aperture of the panel support.

The fastening device 1 is also provided with an outwardly extending rib 15 disposed longitudinally on one of the finger-like members 5 and extending substantially from the flanged end portion 7 to the bottom of the base portion 3. The wall of the aperture 12 is provided with a cut-out portion for receiving the outwardly extending rib 15 thereby to orient the article to be supported with respect to the panel support 13, as well as to prevent rotation of the fastener within the aperture.

Internal teeth or barbs 17 are also provided on the finger-like members 5, one or more adjacent the flanged, free end of the longitudinal edge of each of the finger-like members 5. The barbs are bent inwardly so that the point of each barb extends downwardly toward the cup-like base portion 3 into engagement with a coil form or the like 19. When the cylindrical form 19, which may be considered as the article to be supported, and which generally comprises a penetratable material, is inserted within the fastening device 1, the barbs 17 will penetrate and grip the cylindrical form and thereby resist removal of the form from the fastener.

Many devices, like the variable inductance coil 20 on the form 19 shown in Figure 3 of the drawing, have a core element 21 which is axially adjustable to vary the inductance thereof in well known manner. A screw or other threaded member 23 is usually mounted on the coil form extending axially beyond an end thereof and is connected to the core element 21 in a suitable manner for effecting adjustment thereof. In order to provide for the threaded adjusting member 23 to extend through the panel and hence through the fastener 1, an aperture 25 is provided in the bottom of the cup-like base portion 3. On the other hand, the cup-like base portion may also be provided with a thread impression or other similar thread engaging means such as that disclosed in the above-identified Patent Number 2,326,903. In addition thereto, while the fastening device described herein may be constructed with as few as two finger-like members 5, we have found that at least three finger-like members should be provided in order to effect stability and firmly hold the article to be supported in a manner to prevent movement of the article away from its normal position relative to the panel support.

From the foregoing description, it will be apparent to those persons skilled in the art that we have provided an improved fastening device that may be inserted into an opening in a thin-walled panel support and which will automatically lock itself into self-sustaining position thereon. Our improved fastening device is readily adaptable to production line assembly operations, particularly those in which it is required that the fastener be mounted on the instrument to be supported prior to attachment to the panel support. In addition thereto, our improved fastener is more suitable for automatic assembly operations than other fasteners of its kind because it has a minimum of openings and projecting parts which ordinarily cause entanglement. Because of this, the fasteners of our present invention may be fed automatically from a hopper without having been prealigned.

It will also be recognized by those persons skilled in the art that other modifications and changes apart from the single, preferred embodiment of our invention described herein are possible within the spirit of our invention. Therefore, we desire that the particular form of our invention described herein shall be considered as illustrative and not as limiting.

What is claimed is:

1. A fastening device for attaching an article to a support having an opening therein and being insertable into said opening, said device comprising a hollow body having a base provided with an aperture, and a plurality of circumferentially distributed, spaced, finger-like members extending from said base, each of said finger-like members terminating in part in an outwardly extending flange adapted to engage one surface of said support and in part in an outwardly directed tongue element adjacent to and inclined away from said flange and adapted to engage the opposite surface of said support, said flanges and said tongue elements cooperating with each other to secure said device to said support.

2. A fastening device as set forth in claim 1 wherein the free end of said tongue element slopes gradually away from said outwardly extending flange.

3. A fastening device as set forth in claim 1 wherein each said outwardly extending flange is disposed along substantially one half the width of its finger-like member at the free end thereof, the remainder of the width of each said finger-like member gradually sloping away from said flange.

4. A fastening device as set forth in claim 1 and wherein at least one inwardly extending barb is provided on the longitudinal edge of each of said finger-like members adjacent its said flange.

5. A fastening device as set forth in claim 1 and wherein at least one of said finger-like members is provided with an outwardly extending, longitudinally disposed rib adapted to engage a detent in the wall of said support opening for preventing rotation of said fastening device with respect to said support.

DONALD MACKEY.
ANGELO G. LAZZERY.

REFERENCES CITED

The following references are of record in the file of this patent:

UNITED STATES PATENTS

| Number | Name | Date |
|---|---|---|
| 1,737,375 | King | Nov. 26, 1929 |
| 1,987,035 | Tideman | Jan. 28, 1935 |
| 2,230,923 | Barry | Feb. 4, 1941 |
| 2,326,903 | Tinnerman | Aug. 17, 1943 |
| 2,356,934 | Ketcham | Aug. 29, 1944 |
| 2,468,333 | Johnson | Apr. 26, 1949 |